(12) United States Patent
Zanetti et al.

(10) Patent No.: US 11,081,254 B2
(45) Date of Patent: Aug. 3, 2021

(54) SMART HOME CABLE

(71) Applicants: Luca Zanetti, Orlando, FL (US); Silvia Fioravanti, Orlando, FL (US)

(72) Inventors: Luca Zanetti, Orlando, FL (US); Silvia Fioravanti, Orlando, FL (US)

( * ) Notice: Subject to any disclaimer, the term of this patent is extended or adjusted under 35 U.S.C. 154(b) by 0 days.

(21) Appl. No.: 16/926,736

(22) Filed: Jul. 12, 2020

(65) Prior Publication Data

US 2020/0350096 A1 Nov. 5, 2020

Related U.S. Application Data

(60) Provisional application No. 63/044,854, filed on Jun. 26, 2020.

(51) Int. Cl.
| | |
|---|---|
| *H01B 7/02* | (2006.01) |
| *H01B 7/18* | (2006.01) |
| *H01B 1/02* | (2006.01) |
| *H01B 11/22* | (2006.01) |

(52) U.S. Cl.
CPC .......... *H01B 7/1895* (2013.01); *H01B 1/023* (2013.01); *H01B 7/185* (2013.01); *H01B 11/22* (2013.01)

(58) Field of Classification Search
CPC .... H01B 1/023; H01B 7/0045; H01B 7/1895; H01B 7/185; H01B 9/003; H01B 11/002; H01B 11/02; H01B 11/08; H01B 11/1016; H01B 11/1025; H01B 11/22; H01R 13/6471; H01R 13/6591; H02G 3/04; G02B 6/44

USPC ........ 174/102 R, 104, 105, 106, 108, 110 R, 174/113 R, 113 C
See application file for complete search history.

(56) References Cited

U.S. PATENT DOCUMENTS

| | | | | |
|---|---|---|---|---|
| 5,149,915 | A * | 9/1992 | Brunker ................. | H01B 11/02 174/105 R |
| 6,684,030 | B1 * | 1/2004 | Taylor .............. | H04B 10/25751 398/59 |
| 8,948,556 | B2 * | 2/2015 | Yu .......................... | H01B 11/22 385/101 |
| 9,188,756 | B2 * | 11/2015 | Register, III ............. | H05K 9/00 |
| 9,979,145 | B2 * | 5/2018 | Wu ......................... | H05K 1/111 |
| 2003/0121694 | A1 * | 7/2003 | Grogl ...................... | H01B 7/041 174/113 R |
| 2006/0031611 | A1 * | 2/2006 | Konda ...................... | H04N 7/22 710/72 |
| 2010/0329614 | A1 * | 12/2010 | Keller ................... | G02B 6/4416 385/101 |
| 2011/0311191 | A1 * | 12/2011 | Hayashishita ......... | G02B 6/446 385/101 |
| 2012/0008906 | A1 * | 1/2012 | Han ..................... | G02B 6/4416 385/101 |

(Continued)

*Primary Examiner* — William H. Mayo, III
(74) *Attorney, Agent, or Firm* — Barry Choobin; Patent 360

(57) ABSTRACT

A transmission system including a hybrid cable for optical and electrical data transfer. The smart cable includes an outermost sheath and an inner aluminum foil adjacent to the outermost sheath. The inner aluminum foil defining an annular space that contains a number of cable lines. A filler fills any space within the annular space. The cable lines include at least four optical fiber lines each connected to an optical connector, at least one optical fiber line connected to a Toslink connector; and at least one aux cable. Each of the cable lines can be of a different length from other cable lines.

11 Claims, 6 Drawing Sheets

(56) References Cited

U.S. PATENT DOCUMENTS

| | | | | |
|---|---|---|---|---|
| 2012/0051701 A1* | 3/2012 | Sicari | ............... | G02B 6/4463 |
| | | | | 385/100 |
| 2013/0292171 A1* | 11/2013 | Richards | ............. | H02G 3/0487 |
| | | | | 174/70 C |
| 2013/0294735 A1* | 11/2013 | Burris | ............... | G02B 6/4471 |
| | | | | 385/101 |
| 2017/0047997 A1* | 2/2017 | Chen | ............... | H04B 10/503 |

\* cited by examiner

SMART HOME CABLE

CROSS-REFERENCE TO RELATED APPLICATIONS

This application claims priority to the U.S. provisional patent application Ser. No. 63/044,854 filed on Jun. 26, 2020, which is incorporated herein by reference in its entirety.

FIELD OF INVENTION

The present disclosure relates to a cable, and particularly to a hybrid cable for simultaneously transmitting multiple signals.

BACKGROUND

Cables are indispensable for connecting electrical appliances. The cables are used to transmit data between the electrical appliances. Besides the data, the cables are also used to transmit control signals. High-resolution video and audio data have become more common nowadays, which require high bandwidth cables. To meet the need of today's AV technology, several cables, such as HDMI cables, Toslink cables, Cat-X cables, Aux cables, etc. are used in a home. Moreover, optical fiber cables transmit high-resolution video data over longer distances.

However, the use of too many cables leads to an undesirable clutter. Too many cables may also make the cabling in a building complex. Often, space restrictions for cable installation may limit the number of cables that can be installed in a building. Thus, a need is appreciated for a cable that can overcome the above problems.

SUMMARY OF THE INVENTION

The principal object of the present invention is therefore directed to a hybrid cable that can transmit multiple signals.

It is another object of the present invention that the hybrid cable disclosed herein incorporates multiple types of cable avoiding a clutter of individual cables.

It is still another object of the present invention that the hybrid cable is economical in comparison to the combined cost of the individual cables.

In one aspect, disclosed herein is a hybrid cable that includes an outer jacket, an inner concentric aluminum foil adjacent to the outer jacket. Within the aluminum foil extends electric cables, optical fiber cables, Toslink cables, USB cables, and other cables typically used in a high-resolution home entertainment system.

In one aspect, disclosed herein is a hybrid cable comprising an outermost sheath; an inner aluminum foil adjacent the outermost sheath, the inner aluminum foil defining an annular space; a plurality of cable lines that extend within the annular space; and a filler configured to fill an empty space within the annular space, wherein, the plurality of cable lines comprises at least four optical fiber lines each connected to an optical connector, at least one optical fiber line connected to a Toslink connector; at least one aux cable.

In one aspect, disclosed herein is a hybrid cable having the plurality of cable lines configured to simultaneously transmit audio data, video data, internet data, control signals, USB data, and infrared control signals. The hybrid cable is having a proximal end and a distal end, wherein each of the plurality of cable lines having a first extended part that extends from the proximal end, wherein length of each of the first extended parts of the plurality of cable lines is distinct. Each of the plurality of cable lines also having a second extended part that extends from the distal end, wherein length of each of the second extended part of the plurality of cable lines is distinct. The filler can be Kevlar fibers. The plurality of cable lines may further comprise at least one electric cable line configured for transmitting IR control signals, the at least one electric cable line is having an outer aluminum foil shield.

In one aspect, the plurality of cable lines that extend within the hybrid cable disclosed herein comprises HDMI cable lines connected to an HDMI connector; six optical fiber lines each connected to an optical connector, two optical fiber line connected to a Toslink connector; one aux cable; wherein the length of the first extended part and the second extended part of the one aux cable is largest.

In one aspect, disclosed herein is a hybrid cable comprising an outer sheath; an inner shielding foil, coaxial with the outer sheath, the inner shielding foil defining an annular channel; a plurality of cable lines that extends within the annular channel, the plurality of cable lines comprising one HDMI cable line, one USB cable line, one infrared cable line, six optical fiber lines, and one Toslink cable line, wherein the external diameter of the hybrid cable is about 8 mm. The infrared cable line is further having an aluminum foil shield.

In one aspect, disclosed herein is a transmission system comprising a hybrid cable further comprising an external protective sheath; an inner shield foil adjacent to and coaxial with the external protective sheath, the inner shield foil defining a hollow channel; a plurality of cable lines that extend within the hollow channel, the plurality of cable lines comprises at least four optical fiber lines each connected to a first optical connector; a plurality of electrical lines connected to a plug. The transmission further includes an optical transmitter. The optical transmitter comprising a transmitting circuitry configured for converting electrical signals into light signals for transmitting onto the at least four optical fiber lines; at least four second optical connectors configured to removably connect with the first optical connectors; and a socket configured to receive the plug, the socket including a plurality of pins configured to electrically coupled with the plurality of electrical lines. The plurality of cable lines may further include at least two fiber optic cables each connected to a Toslink connector; and an Aux cable line. The optical transmitter may further comprise an HDMI port configured for connecting the optical transmitter with a source device. The source device can be a set top box, a multimedia player, a desktop, and like.

These and other objects and advantages of the embodiments herein will become readily apparent from the following detailed description.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings are to scale.

Figure 1:
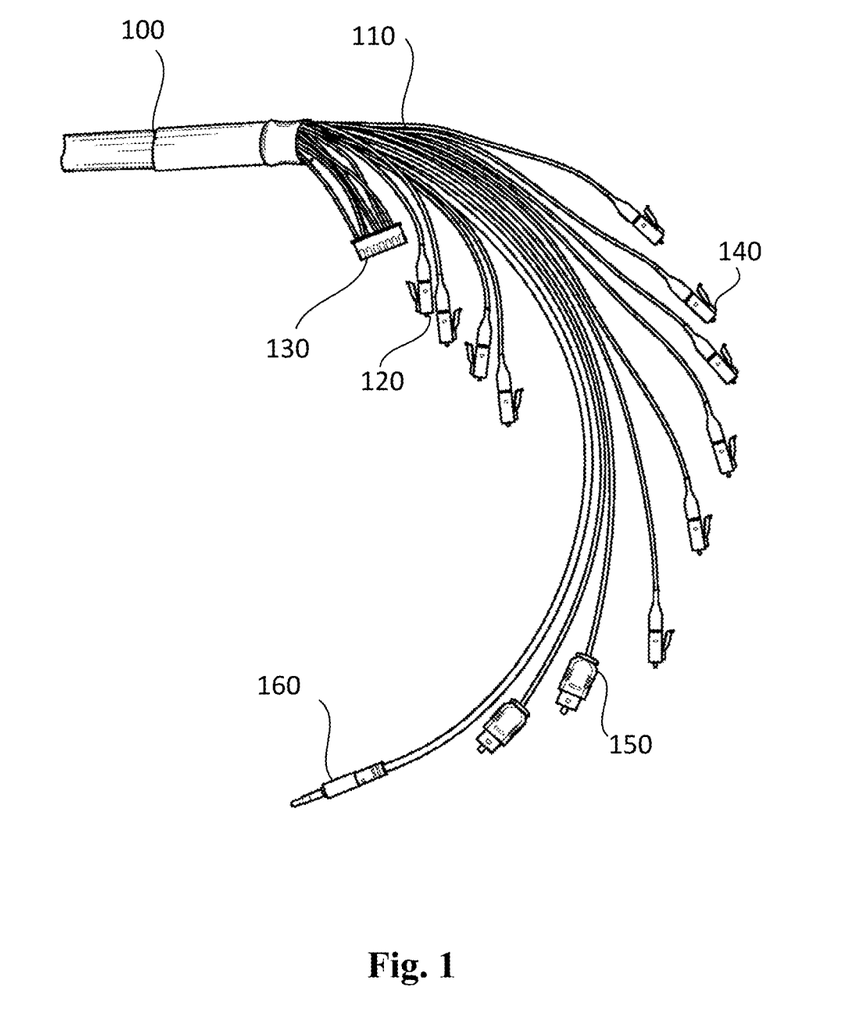
FIG. 1 is a perspective view of a hybrid cable, according to an embodiment of the present invention.

Referring to FIG. 1, which shows an embodiment of a hybrid cable 100 according to the present invention. FIG. 1 shows a near-end part of the hybrid cable 100 wherein several lines 110 can be seen extending from the end of the hybrid cable 100. The hybrid cable includes an external jacket which encloses the lines 110. FIG. 1 shows four optical fiber connectors connected to four optical fiber lines and a plug 130 connected to seven electrical lines. The four optical fibers 120 and the plug 130 can be connected to an optical transmitter shown in FIG. 2. The optical transmitter can be a part of an optical transmission system which also includes a similar optical receiver.

Figure 2:
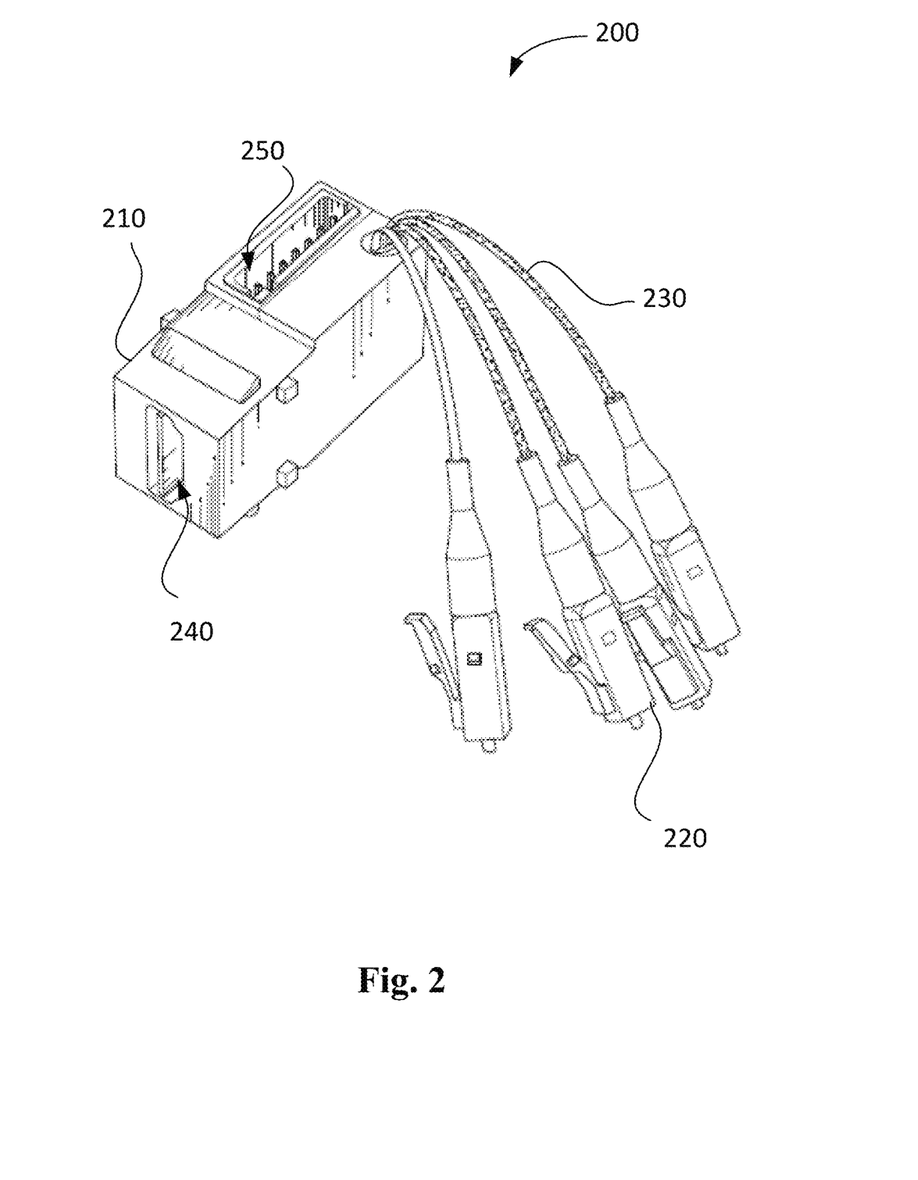
FIG. 2 is a perspective view of an optical transmitter having an HDMI interface, according to an embodiment of the present invention.

FIG. 2, shows a perspective view of an optical transmitter 200 according to one implementation of the present invention. The optical transmitter 200 is shown to include a housing 210 enclosing a transmitting circuitry and laser. The optical transmitter 200 provides for high bandwidth data transfer over long distances, for example, 1000 feet and more without any lag. The optical transmitter 200 can transfer full speed uncompressed video data through optical fiber cables. Referring to FIG. 1, four optical connectors 220 can be seen extending from the housing 210. The optical connectors 220 can be removably connected to the four optical connectors 120 shown in FIG. 1. In one case, the optical connectors can be an LC OM3 connector, as shown in FIG. 1, that is both economical and readily available. Furthermore, can be seen in FIG. 2 is a socket 250 having seven electrical pins. The plug 130 shown in FIG. 1, can be connected to the socket 250 for electrical connectivity between the optical transmitter and the optical receiver. The plug 130 is also having seven pins which electrically connect to the socket 250 of the optical transmitter. The optical transmitter is further shown to have an HDMI port 250 for connecting to a sink device, such as a TV, projector, or monitor. The four connectors 220 in FIG. 2 also extends from four optical fiber lines 230 that connect the four connectors 220 to the transmitting circuitry of the optical transmitter.

FIG. 1 further shows six additional optical connectors 140 that can connect to the media device for transmitting data as light signals. Two Toslink lines with Toslink connectors 150 can also be seen in FIG. 1. Additionally, an Aux cable 160 can also be seen extending from the hybrid cable 100.

Figure 3:
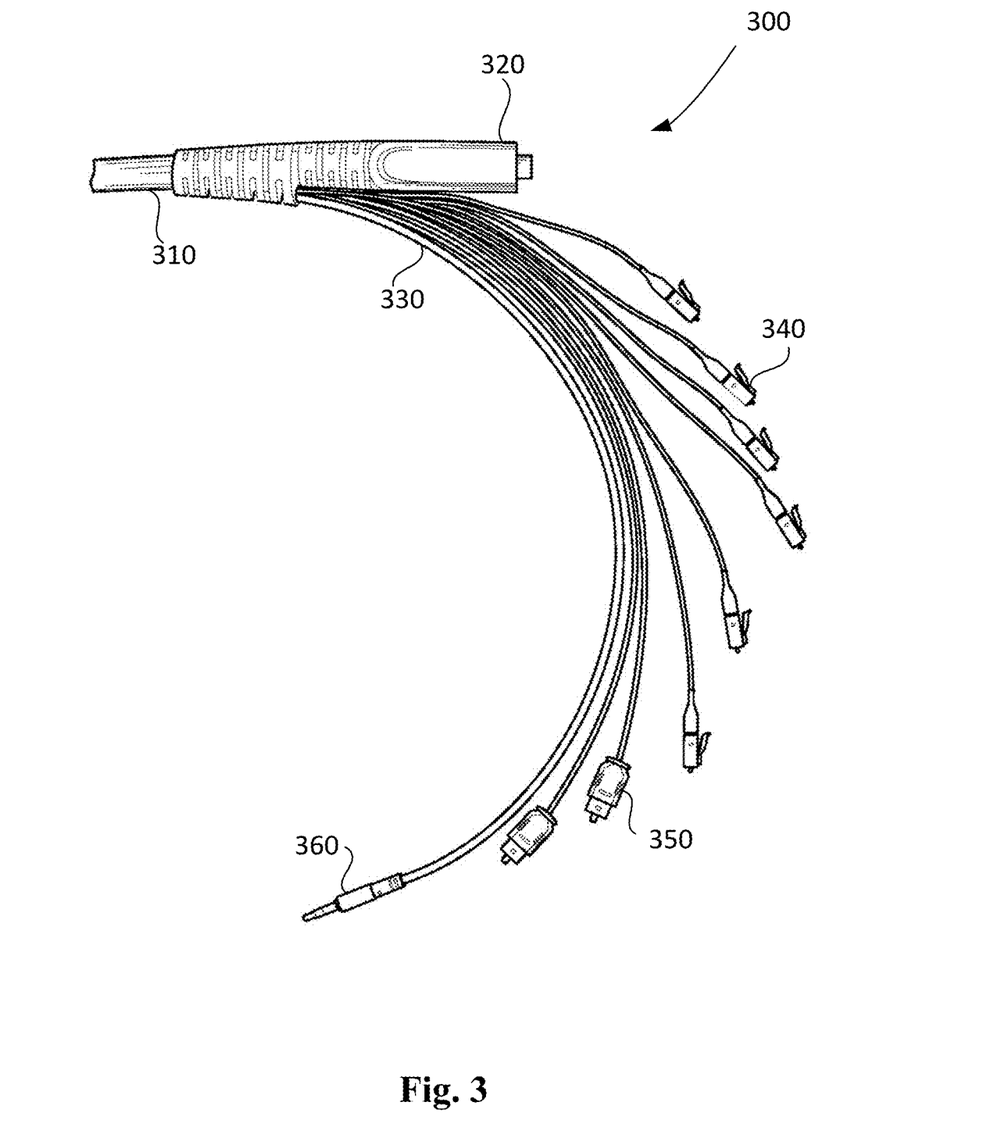
FIG. 3 shows another embodiment of the hybrid cable, according to the present invention.

FIG. 3 shows another implementation of the hybrid cable 300 which includes a hybrid cable part 310 and an HDMI connector 320 that is shown connected to the hybrid cable part 310. The hybrid cable part 310 can include a proximal end and a distal end. FIG. 3 shows the proximal end of the hybrid cable part 310. The distal end of the hybrid cable part 310 can be the same or different from the proximal end. The hybrid cable part 310 in addition to the lines of HDMI connector 120, also encloses nine additional lines 330. These nine lines can be seen extending from the proximal end of the hybrid cable part 310. The part of lines being extended from the proximal end of the hybrid cable part 310 can be herein referred to as the extended part of the line. Six of the nine lines 330 are shown to connect with optical fiber connectors 340. These optical fiber lines can be used to transmit high bandwidth data as light signals. Two of the nine lines 330 are shown to connect with Toslink connectors 350 for high-quality audio transmission. Additionally, an Aux cable line 360 is also shown included in the hybrid cable 300.

FIG. 3 further shows that each extended part of the nine lines extend from the proximal end is having a length different from the other extended part of lines. For example, the length of extended parts of the line increase in ascending order, wherein one of five optical fiber line is of shortest length, while the other four optical fiber lines gradually increase in length. The extended part of the Toslink line 350 is having a length larger than that of the extended part of the optical fiber lines 340. The two Toslink line 350 are also of different lengths. The Aux cable line 360 is shown to have the largest length among the extended parts of the nine lines 330. Such an arrangement of the cable lines extending from an end of the hybrid cable resembles a ponytail, wherein each strand of the ponytail is different from the lengths of the other strands. Such an arrangement of the extended part of cable lines is advantageous by preventing a clutter of connectors, which is bulgy, the connectors keep colliding with each other, and causes tangling of the wire lines. The hybrid cable 100 shown in FIG. 1 is also having a similar ponytail like arrangement of the extended parts of the cable lines. It is to be noted that any cable line can be of a length larger or smaller than the other lines. Although both FIGS. 1 and 3 shows the Aux cable line of largest length, the Aux cable line can also be of the smallest length.

Figure 4:
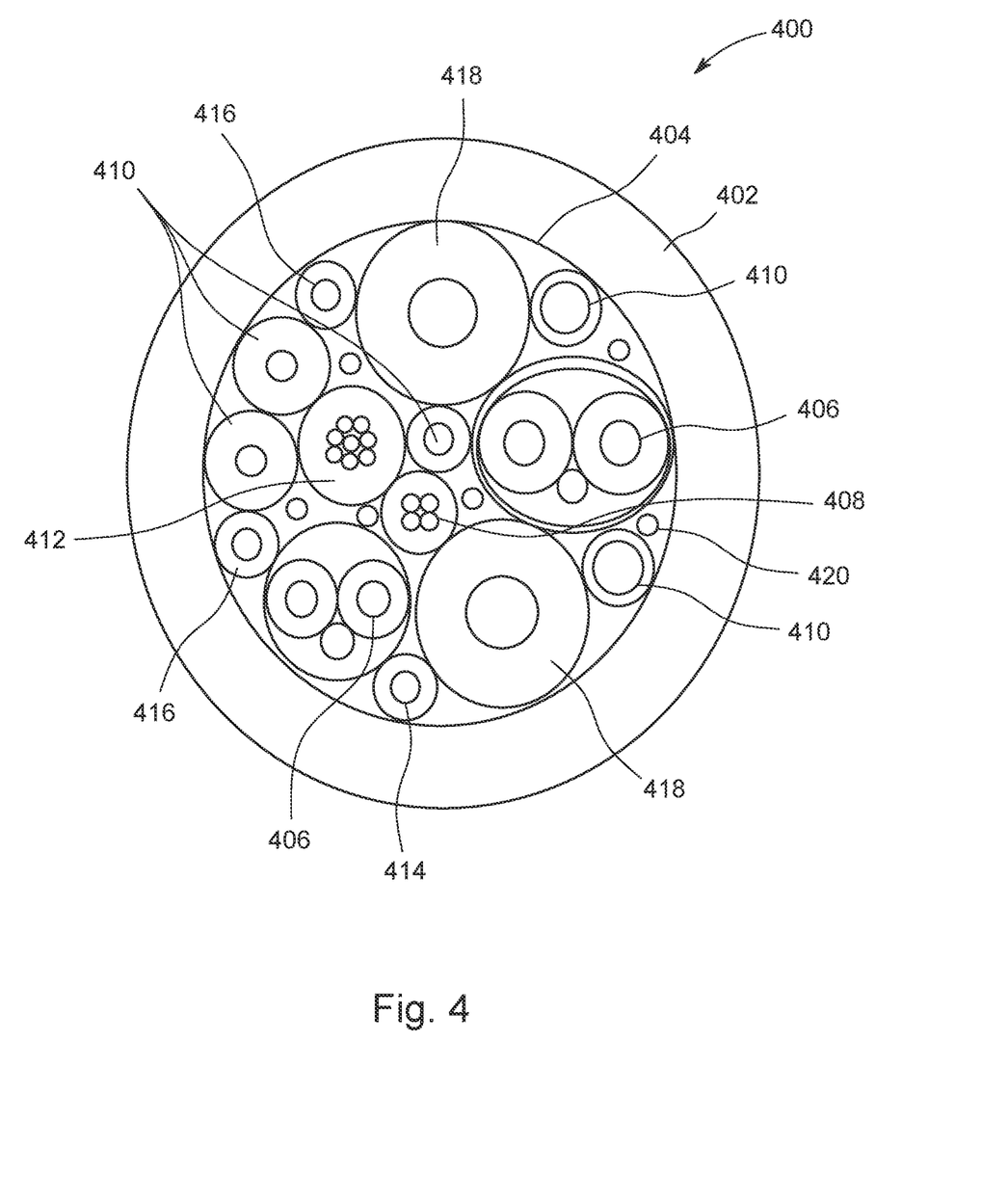
FIG. 4 is a cross-section view of the hybrid cable, according to an exemplary embodiment of the present invention.
Figure 5A:
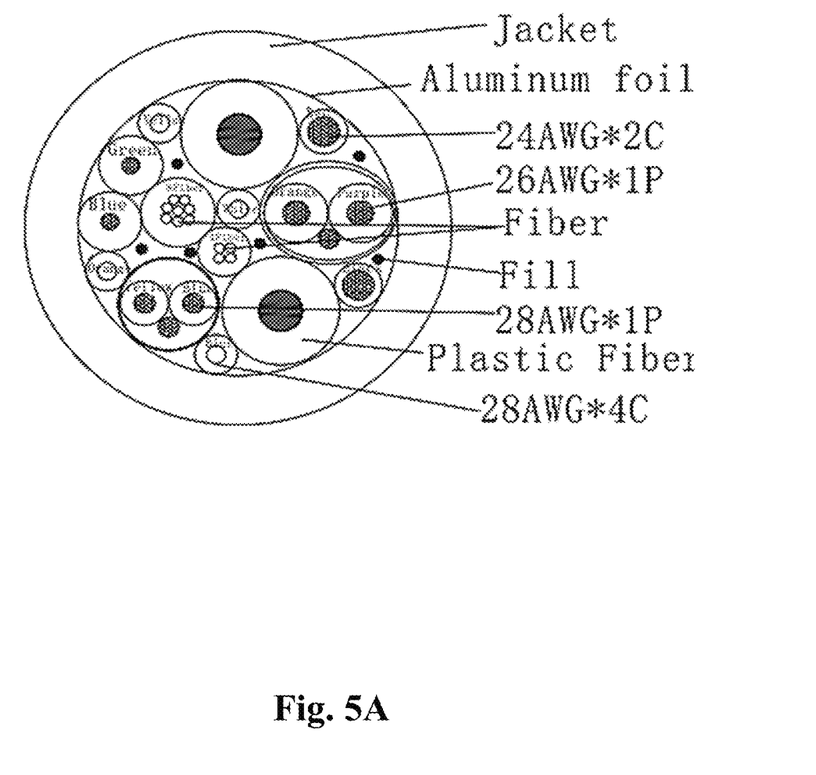
FIG. 5 is a table showing the technical details of the hybrid cable of FIG. 4.
Figure 5B:
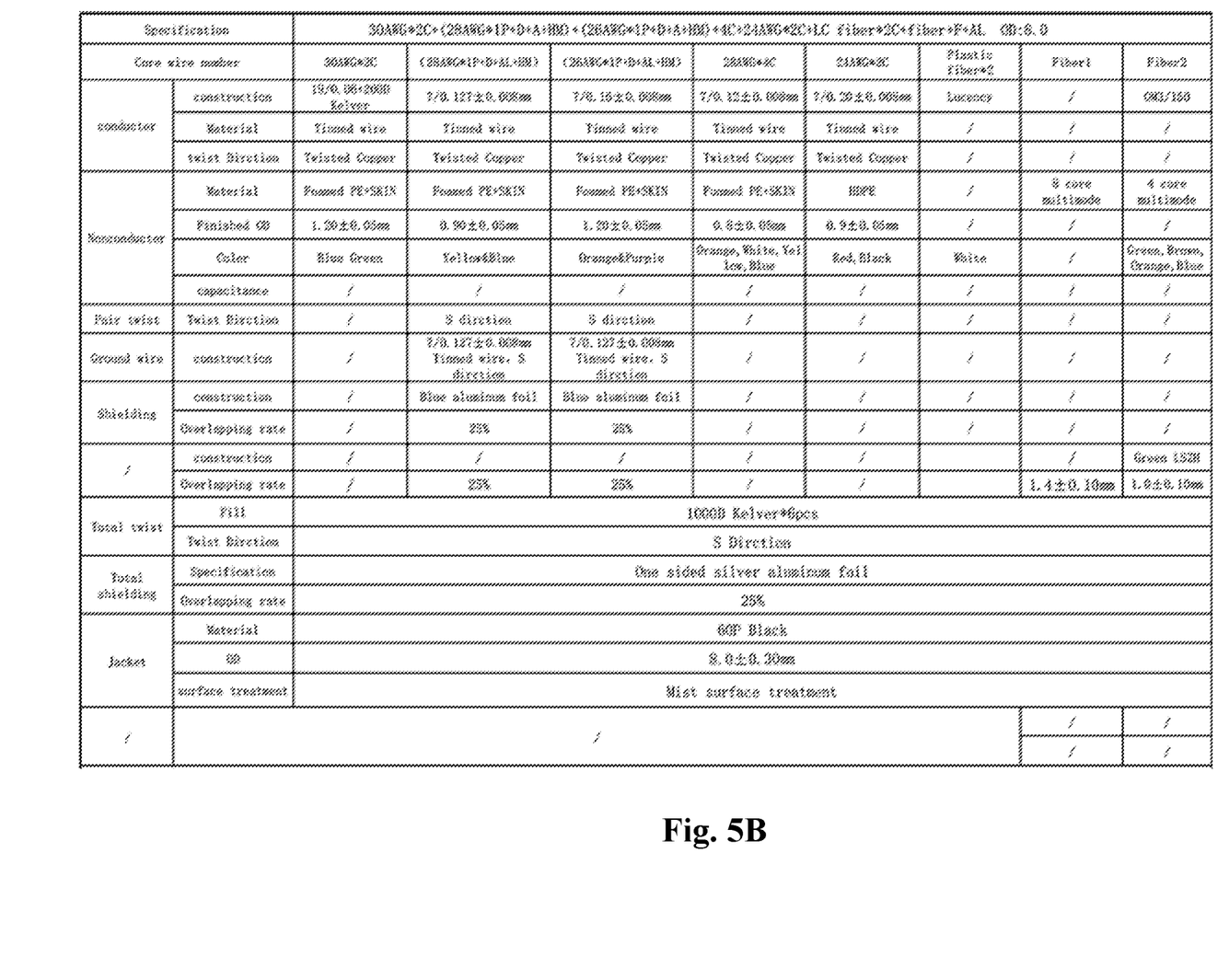

FIG. 4 is a sectional view of the hybrid cable 400 showing its internal structure. As can be seen in FIG. 4, the hybrid cable 400 includes an outer jacket 402 which is a hose-like structure, or an external sheath made of sturdy material. The outer jacket 402 protects the internal cable lines from damage. The hybrid cable is a multifunctional cable that can be used for transmitting audio, video, data, internet, and like multimedia signals as either electrical or light signals connecting a typical high-quality home entertainment system. The individual cable lines in the hybrid cable are shielded and can transmit the signals without any interference. The hybrid cable, disclosed herein, is an entertainment and smart home multifunctional transmission cable. The hybrid cable, disclosed herein, is specifically useful for the integration of the challenging signals within the home including the cable TV, IPTV, Satellite TV, Infrared control, high bandwidth internet, gaming, SDI, Coax, digital audio, PC play, TV Box, AV receivers, and room speakers. The structure of the hybrid cable is non-symmetric, the individual cable lines being extended within the annular space of the hybrid cable.

Advantageously, several individual cable lines are included for each cable type for the transmission of the particular signals within the hybrid cable. For example, optical cable lines are included for the transmission of the high-resolution HDMI audio & video. Two special optic cables can be included for the transmission of digital audio. Likewise, more single cable lines or fiber-optic of the same type can also be included.

In one implementation, the hybrid cable can include:
Two electric wires and ground wire with outer shield foil provided for infrared Uni/Bi-directional remote & serial control;
Two electric wires and ground wire with outer shield foil can be provided for secondary control channel;
Five wires can be provided for connection/data/handshaking/power supply/control;
Three wires can be provided for auxiliary connection/data/handshaking/power supply/control;
Four optical fibers can be provided for transport of high-quality video up to 48 Gbps and higher uncompressed for 4K plus resolution video data;
Two optical fibers can be provided for 10 Gigabit plus bandwidth ethernet connection;
Two special optical fiber can be provided for Bi-directional Toslink audio;
Two optical fiber can be provided for USB transmission (any speed and standard) data connection; and
Four optical fiber can be provided for future implementation of any data, control, audio, video, USB, ethernet, split video, other signals that can be carried onto an optical fiber.

In addition, the hybrid cable may also include Kevlar fibers with a dual function of filler to fill the inner space, such that there are no gaps in the inner spaces and anti-stretch function to avoid any damage to the cable by an accidental pull. The hybrid cable can be encased in an outer sheath. Adjacent the outer sheath can be a global cable shield foil. The bundle of individual cable lines can be expediently located in an annular space inside the shield and the outer sheath. A banding, preferably designed as a fleece, can also be provided between the inner space and the hose to increase the tensile strength of the hybrid cable.

The advantages achieved by hybrid cable disclosed herein is the integration of several cable types for the transmission of audio, video, and other data in a single multifunctional hybrid cable. The multifunction cable, disclosed herein, is suitable for home cabling, particularly, for the smart entertainment system that involves HDMI, infrared, internet, USB, Audio, Data, and other cable lines. A single hybrid cable for transmitting a range of signals can minimize the cabling efforts in a tidy manner. All individual cable lines can be individually shielded or shielded in groups, and on top of that can benefit from the outer aluminum foil shield. Shielding is the key to transport all these complex signals intact on a long-distance, uncompressed and with zero delay.

Referring to FIG. 4, the cross-section view of the hybrid cable for entertainment and smart home purposes with several individual cable lines of different cable types. The transmission cable, also referred herein as the hybrid cable, for transmitting distinct signals for audio, video, control, and data comprises an external sheath or external waveguide or hose 402 which is arranged coaxially around the cable lines.

TABLE 1

| | Reference Numerals: |
|---|---|
| 402 | external sheath; |
| 404 | an inner hose coaxial with the outer sheath 402, the inner hose or sheath can be an isolating foil that avoids interferences or signal disruption. The foil 404 is particularly important due to the sophisticated nature of the carried signals that the hybrid cable 400 is meant to transmit. |
| 406 | The annular space of the hybrid cable 400 includes a bundle of cable lines including a group of two cables 406 (TX, RX, and GND), wrapped in a coaxial shielding jacket, 26AWG*1P, is secondary data bus, command or infrared line. Another group of two cables 406 (TX, RX and GND), wrapped in a coaxial shielding jacket, 28AWG*1 P, is the primary data bus or infrared. A cable 28AWG*4C, as a spare wire 414 for future use. |
| 408 | A group of four optical fibers 408 in a coaxial jacket dedicated to HDMI video signal. |
| 410 | Five wires 410 for HDMI control, CEC, ARC, EARC |
| 412 | A group of eight optical fibers in a coaxial jacket, for multipurpose use such as USB, Internet, gaming, and other application |
| 414 | Additional cable ready for future use |
| 416 | Two optical fibers to be used for two audio Toslink or similar application |
| 418 | Two power cables one is positive and the other is negative |
| 420 | Filler in Kevlar anti stretch |

In one implementation, the hybrid cable includes a 60P black 8.0 mm with a mist surface treatment jacket. An inner one-sided silver aluminum foil with a 25% overlapping rate is coaxial with the outer jacket. The inner cable lines include one HDMI cable line, one USB cable line, one infrared cable line, six optical fiber lines, and one Toslink cable line. The external diameter of the above hybrid cable is about 8 mm. Additionally, the IR/data channel is a combination of TX RX GND that has an additional shielding of blue aluminum foil with 25% overlapping.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A hybrid cable comprising:
an outermost sheath;
an inner aluminum foil adjacent to and coaxial with the outermost sheath, the inner aluminum foil defining a hollow channel, the hollow channel having a proximal end and a distal end;
a plurality of cable lines that extend within the hollow channel; and
a filler configured to fill a space within the hollow channel,
wherein, the plurality of cable lines comprises:
at least four optical fiber lines each connected to an optical connector,
at least one aux cable;
at least one cable line for transmitting IR control signals and is having an outer aluminum foil shield,
wherein each cable line of the plurality of cable lines has a first extended part that extends from the proximal end of the hollow channel, wherein a length of each first extended part is distinct from other first extended parts of the plurality of cable lines.

2. The hybrid cable of claim 1, wherein the plurality of cable lines configured to simultaneously transmit audio data, video data, internet data, control signals, and USB data.

3. The hybrid cable of claim 1, wherein each cable line of the plurality of cable lines having a second extended part that extends from the distal end of the hollow channel, wherein a length of each second extended part is distinct from the other second extended parts of the plurality of cable lines.

4. The hybrid cable of claim 3, wherein the plurality of cable lines comprises:
HDMI cable lines connected to an HDMI connector;
six optical fiber lines each connected to an optical connector, two optical fiber lines each connected to a Toslink connector;
one aux cable;
wherein the length of the first extended part and the second extended part of the one aux cable is largest.

5. The hybrid cable of claim 1, wherein the filler is Kevlar fibers.

6. A hybrid cable comprising:
an outer sheath;
an inner shielding foil, coaxial with the outer sheath, the inner shielding foil defining an annular channel, the annular channel having a proximal end and a distal end;
a plurality of cable lines that extends within the annular channel, the plurality of cable lines comprises:
one HDMI cable line,
one USB cable line,
one infrared cable line,
six optical fiber lines, and
one Toslink cable line,
wherein each cable line of the plurality of cable lines has a first extended part that extends from the proximal end of the annular channel, wherein a length of each first extended part is distinct from other first extended parts of the plurality of cable lines.

7. The hybrid cable of claim 6, wherein the infrared cable line is further having an aluminum foil shield.

8. A transmission system comprising:
a hybrid cable comprising:
an external protective sheath;
an inner shield foil adjacent to and coaxial with the external protective sheath, the inner shield foil defining a hollow channel;
a plurality of cable lines that extend within the hollow channel, the plurality of cable lines comprises:
at least four optical fiber lines connected to at least four first optical connectors;
a plurality of electrical lines connected to a plug; and
an optical transmitter comprising:
a housing;
a transmitting circuitry enclosed in the housing and configured for receiving electrical signals from a source device and converting electrical signals into light signals;
at least four second optical connectors connected to the transmitting circuitry through at least four optical cables for receiving the light signals, the at least four optical cables extend from the housing, the at least four second optical connectors configured to removably connect with the at least four first optical connectors for transmitting the light signals onto the at least four optical fiber lines; and
a socket disposed in the housing and configured to receive the plug, the socket including a plurality of electrical pins electrically connected to the transmitting circuitry, the plurality of electrical pins configured to electrically connect the transmitting circuitry to the plurality of electrical lines.

9. The transmission system of claim 8, wherein the plurality of cable lines further comprises:
at least two fiber optic cables each connected to a Toslink connector; and
an Aux cable line.

10. The transmission system of claim 8, wherein the optical transmitter further comprises an HDMI port configured for connecting the optical transmitter with the source device.

11. The transmission system of claim 8, wherein the socket comprises seven electrical pins.

* * * * *